United States Patent Office 3,287,479
Patented Nov. 22, 1966

3,287,479
METHOD OF PREPARING A WOOD
PARTICLE BOARD
Edward A. Naudain, Newark, Del., assignor to Hercules
Incorporated, a corporation of Delaware
No Drawing. Filed Sept. 13, 1963, Ser. No. 308,697
3 Claims. (Cl. 264—122)

This invention relates to the production of wood particle board and, more particularly, to the production of wood particle board from porous wood.

Wood particle board, comprising wood chips bonded into a board by curing a mixture of heat-setting resin and wood chips under pressure, is produced commercially from soft woods which are non-porous. It has not been economically sound to produce similar boards from porous wood because of the larger amounts of thermosetting resin required. Attempts have been made to reduce costs by mixing cheaper resins with the thermosetting resins. However, this has been at the expense of strength and water resistance. Phenol-formaldehyde resins have, for example, been extended with substantially hydrocarbon-insoluble pine wood resin and used as binders for particulate cellulosic material and there resulted a reduction in strength and water resistance from that of the product obtained without the pine wood resin.

In accordance with the present invention, it has now been found that an improved wood particle board is produced, particularly from porous wood particles, by coating the wood particles first with a thermoplastic resin in an amount sufficient to size the particles, heating to a temperature in the range of about 200° F. to about 450° F. to melt the resin and drive off occluded water until the water content of the particles is reduced to less than about 5%, cooling to a temperature below the melting point of said resin to obtain sized wood particles of substantially reduced porosity, coating said sized wood particles with a thermosetting resin and heating the coated sized wood particles under compression at a temperature in the range of about 200° F. to about 400° F. until a pressed wood particle board is produced.

The process of this invention is applicable to particles of either hard or soft woods, but the advantages of the process are particularly important in the case of the more porous hard woods, such as aspen and poplar, which being porous normally absorb more of the expensive thermosetting resin. Since the binding action of the thermosetting resin between particles adds to the strength and the sizing action of the thermoplastic resin adsorbed by the particles adds to water resistance, the process makes most advantageous use of the two resins. The term "sizing" as used herein is intended to mean the sealing of the wood pores so as to reduce their suction or ability to absorb liquids.

The wood particles are not limited as to form, but the advantages of this invention apply particularly to large size particles, such as shredded wood, chips, cuttings, splinters, and shavings. The more adsorbent comminuted forms of wood, such as sawdust and wood flour, require more resin and are generally lower in strength. The forms of wood particles used in this process are generally the same as are used in the usual pressed wood processes, the improvement in the present process being the resin sizing of the particles prior to mixing with the bonding resin so as to reduce the amount of bonding resin used.

The wood particles are sized by coating with a thermoplastic resin which, in the case of porous wood, blocks the pores, particularly at the surface openings, and at least partially fills the pores and prevents penetration by the thermosetting binding resin. The thermoplastic resin is applied to the wood particles in any suitable manner. While the resin can be applied as an organic solvent solution, it is more economically applied in powder form and more particularly as an aqueous emulsion or suspension of solid particles.

The thermoplastic resins which are particularly useful are those which are low in price and have ring and ball melting points above about 200° F. and are easily applied, and which also have a degree of compatibility with the thermosetting resin used as a binder so as to obtain good adhesion between the wood particles and the thermosetting resin. While the preferred resin is the substantially petroleum hydrocarbon-insoluble pine wood resin derived from pine wood, other resins may be substituted therefor. Thermoplastic resins which may be used with varying degrees of success include various grades of asphalt and gilsonite, coumarone resins, coumarone-indene resins, polymerized rosin, cellulose esters, thermoplastic polymers and copolymers of vinyl esters and the like. Color and waterproofing qualities introduced must be considered in selection of a suitable resin. The substantially petroleum hydrocarbon-insoluble pine wood resin meets these requirements and is the most satisfactory. Although it is dark in color, it is used in sufficiently low amounts and gives only a light amber color to the wood particles.

The pine wood resin used in accordance with this invention may be defined as the substantially petroleum hydrocarbon-insoluble pine wood resin prepared, for example, in accordance with the processes of U.S. Patents to Hall, Nos. 2,193,026 and 2,221,540. This material, which is characterized herein by the term "substantially petroleum hydrocarbon-insoluble pine wood resin," is the resinous material which may be prepared from pine wood as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. This resin is of a phenolic character and for the purpose of this invention its molecular weight is 450.

Thermosetting resins which are used as the binder are preferably phenol-aldehyde resins, particularly phenol-formaldehyde resins, and urea-formaldehyde resins. These resins may be admixed with a curing catalyst to aid in curing and may be rendered alkaline with sodium hydroxide.

When the thermoplastic resin is substantially hydrocarbon-insoluble pine wood resin, there may be used, in addition to the pine wood resin, a hydrocarbon wax sizing agent as a coating over the pine wood resin. This hydrocarbon wax size is applied after the wood particles have been coated with pine wood resin and heated to reduce the water to less than about 5%. The wax size is preferably added as an emulsion and in amounts in the range of about 0.5% to about 2.0%, based on the pine wood resin treated wood particles. The wax is a solid paraffin wax which is a non-solvent for the pine wood resin. The particle size of the wax in the emulsion is sufficiently low to give good distribution on the wood particles. While the melting point of the waxy may vary over a wide range from as low as about 90° F. to as high as 250° F., a particularly suitable wax is slack wax, melting in the range of 125–135° F., and it may be crude or contain occluded lube oil.

The process of this invention will use the thermoplastic resin in an amount in the range of about 1% to about 10% of the weight of wood particles used. The amount which is used will depend largely on the porosity of the wood used. Substantially all of the pores of the wood should be blocked by the thermoplastic resin so that the surface will not absorb a substantial amount of thermosetting resin. However, an excess of the thermoplastic resin on the surface is undesirable since it will mix with the subsequently applied thermosetting resin and lower the bonding strength. The proper amount to use can be readily determined by measuring for maximum bonding strength on test samples. An excess of thermoplastic resin will result in low water pick up but reduced strength after completion of the preparation of the board with the thermosetting resin. The optimum amount of thermoplastic resin to use is the maximum amount that can be used without reduction in strength.

The amount of thermosetting resin used in preparing the pressed wood particle board of this invention will be in the range of about 3% to 18% of the wood particles in the board and will be generally in the range of 6–10%. The optimum amount is the minimum amount required to attain the desired or maximum strength of the board.

The processes used in the production of wood particle board are essentially those standard in the industry, the improvement in the present invention residing in the use of a thermoplastic resin sizing step prior to the coating of the wood particles with the thermosetting resin used as the binder. Both resins may be applied in the various types of mixers known in the art or they may be applied on belt conveyors. The heating and drying of the particles sized with the thermoplastic resin may be carried out in a dryer, a mixer, or on a belt conveyor. The thermosetting resin may also be applied to the sized wood particles batchwise or continuously and the board may be preformed by prepressing on a belt conveyor prior to the final pressing operation. The final hot-press operation in which the thermosetting resin is cured is usually carried out in a flat-bed press, however, the process is not limited to any particular type of hot-press. Pressures used in the final cure will range from about 150 to about 1500 pounds per square inch.

The following examples, wherein all parts and percentages are by weight, illustrate the process of this invention.

*Example 1*

Ninety-four parts aspen wood flakes (dry basis), having a moisture content of 4.5%, were sprayed while tumbling with 5 parts substantially hydrocarbon-insoluble pine wood resin in the form of a 40% emulsion in water (40% solids). The coated wood flakes were then heated at 325° F. for one hour to melt the pine wood resin and drive off the moisture of the original flakes, as well as that introduced by the emulsion spray. The final moisture content of the treated flakes was 1%. These flakes were then sprayed with 1 part paraffin wax (temperature 125–135° F.) in an aqueous emulsion of 48% solids content, while tumbling, and they were then sprayed with 5 parts curable phenol-formaldehyde resin in an alkaline emulsion (30% solids). The resulting treated flakes, containing 13.5% moisture, were cold pressed into a mat at 700 pounds per square inch and then heated at 350° F. for one-half hour under gradually increased pressure up to a pressure of 300 pounds per square inch. The density of the resulting board was 41.6 pounds per cubic foot. This board, on 24 hours' immersion in water, picked up 21.7 percent water and increased 11.8% in thickness.

A similarly prepared board, prepared from flakes without the initial sizing, with substantially hydrocarbon-insoluble pine wood resin, had a density of 44.6 pounds per cubic foot and showed a 46.6% water pick-up and an 18.7% thickness increase on immersion for 24 hours in water.

*Examples 2 and 3*

Examples 2 and 3 were carried out following the general procedure of Example 1, and the data for all three examples, including corresponding blanks, are tabulated below.

| | 1 | | 2 | | 3 | |
|---|---|---|---|---|---|---|
| | A | B | A | B | A | B |
| Aspen (dry basis) | 94 | 89 | 89 | 84 | 93 | 87 |
| Paraffin wax (48% emulsion) | 1 | 1 | 1 | 1 | 1 | 1 |
| Hydrocarbon-insoluble pine wood resin (40% emulsion) | | 5 | | 5 | | 6 |
| Phenol-formaldehyde resin in alkaline emulsion (30% solids) | 5 | 5 | | | | |
| Phenol-formaldehyde resin in neutral emulsion (72% solids) | | | 10 | 10 | 6 | 6 |
| Hot press, ° F. | 350 | 350 | 350 | 350 | 325 | 325 |
| Density (lb./cu. ft.) | 44.6 | 41.6 | 43.9 | 43.3 | 39.3 | 39.3 |
| Water pick-up (percent) | 46.6 | 21.7 | 39.7 | 10.4 | 35.5 | 11.6 |
| Dimensional increase (percent) | 18.7 | 11.8 | 24.6 | 8.1 | (¹) | 9.9 |

¹ Fell apart.

What I claim and desire to protect by Letters Patent is:

1. The method of preparing a wood particle board from porous wood particles, which comprises coating the wood particles first with a thermoplastic resin in an amount in the range of about 1% to about 10% of the weight of the particles sufficient to size the particles, heating to a temperature in the range of about 200° F. to about 450° F. to melt the resin and drive off occluded water until the water content of the particles is reduced to less than about 5%, cooling to a temperature below the melting point of said resin to obtain sized wood particles of substantially reduced porosity, coating said sized wood particles with a thermosetting resin in an amount in the range of about 3 to 18% of the wood particles and heating the coated sized wood particles under compression at a temperature in the range of about 200° F. to about 400° F. until a pressed wood particle board is produced.

2. The method of claim 1 in which the thermoplastic resin is substantially hydrocarbon-insoluble pine wood resin and the thermosetting resin is a phenol-formaldehyde resin.

3. The method of claim 1 in which the themoplastic resin is substantially hydrocarbon-insoluble pine wood resin and the thermosetting resin is a urea-formaldehyde resin.

No references cited.

ROBERT F. WHITE, *Primary Examiner.*

J. R. HALL, *Assistant Examiner.*